US009369981B2

(12) United States Patent
Yang

(10) Patent No.: US 9,369,981 B2
(45) Date of Patent: Jun. 14, 2016

(54) METHOD AND APPARATUS FOR SENDING USER EQUIPMENT LOCATION INFORMATION

(75) Inventor: Yi Yang, Beijing (CN)

(73) Assignee: China Academy of Telecommunications Technology, Beijing (CN)

(*) Notice: Subject to any disclaimer, the term of this patent is extended or adjusted under 35 U.S.C. 154(b) by 141 days.

(21) Appl. No.: 14/129,105

(22) PCT Filed: Mar. 27, 2012

(86) PCT No.: PCT/CN2012/073114
§ 371 (c)(1),
(2), (4) Date: May 19, 2014

(87) PCT Pub. No.: WO2012/174915
PCT Pub. Date: Dec. 27, 2012

(65) Prior Publication Data
US 2014/0295879 A1 Oct. 2, 2014

(30) Foreign Application Priority Data

Jun. 24, 2011 (CN) .......................... 2011 1 0174366

(51) Int. Cl.
H04W 24/00 (2009.01)
H04W 64/00 (2009.01)
H04W 60/04 (2009.01)
H04W 84/04 (2009.01)

(52) U.S. Cl.
CPC .............. *H04W 64/00* (2013.01); *H04W 60/04* (2013.01); *H04W 84/047* (2013.01)

(58) Field of Classification Search
CPC .... H04W 64/00; H04W 60/04; H04W 84/047
USPC ........................................................ 455/456.1
See application file for complete search history.

(56) References Cited

U.S. PATENT DOCUMENTS

2010/0260097 A1* 10/2010 Ulupinar .............. H04B 7/2606
370/315
2010/0311419 A1* 12/2010 Bi .............................. 455/435.1

(Continued)

FOREIGN PATENT DOCUMENTS

CN 101111088 A 1/2008
CN 101594606 A 12/2009

(Continued)

OTHER PUBLICATIONS

Espacenet Description: CN102098723 (A)—Jun. 15, 2011.*

(Continued)

*Primary Examiner* — Mahendra Patel
(74) *Attorney, Agent, or Firm* — Blakley, Sokoloff, Taylor & Zafman LLP

(57) ABSTRACT

Disclosed is a method for sending user equipment location information, used for a network side to accurately determine the location of a user equipment. The method comprises: a relay node (RN) receives configuration information representing the reporting condition of user location information from a control interface management device; and when the reporting condition is satisfied, the RN sends cell-related information representing the user location information to the control interface management device. Also disclosed is an apparatus for implementing the method.

14 Claims, 8 Drawing Sheets

(56) References Cited

U.S. PATENT DOCUMENTS

| | | | |
|---|---|---|---|
| 2010/0329216 A1* | 12/2010 | Jen | H04B 7/2606 370/332 |
| 2011/0080890 A1 | 4/2011 | Cai et al. | |
| 2012/0120849 A1* | 5/2012 | Kazmi | H04W 24/02 370/255 |
| 2012/0142357 A1* | 6/2012 | Aminaka | H04W 36/0055 455/437 |
| 2013/0329629 A1* | 12/2013 | Bao | H04W 36/0083 370/315 |
| 2013/0337811 A1* | 12/2013 | Faerber | H04W 36/0072 455/436 |

FOREIGN PATENT DOCUMENTS

| | | |
|---|---|---|
| CN | 101873524 A | 10/2010 |
| CN | 101626565 A | 1/2011 |
| CN | 102088756 A | 6/2011 |
| CN | 102098723 A * | 6/2011 |
| CN | 102223603 A | 10/2011 |
| CN | 102264027 A | 11/2011 |

OTHER PUBLICATIONS

Espacenet Claims: CN102098723 (A)—Jun. 15, 2011.*
PCT International Search Report for PCT Counterpart Application No. PCT/CN2012/073114, 4 pgs., (Jul. 5, 2012).
European Patent Office Communication enclosing Extended European Search Report for corresponding European Patent Application No. 12802855.2, 6 pp., (Oct. 22, 2015).
PCT Written Opinion of the International Searching Authority for counterpart PCT Application No. PCT/CN2012/073114, 28 pp. (including English translation), (Jul. 5, 2012).
PCT Notification Concerning Transmittal of International Preliminary Report on Patentability (Chapter I of the Patent Cooperation Treaty) for counterpart PCT Application No. PCT/CN2012/073114, 31 pp. (including English translation), (Jan. 9, 2014).

* cited by examiner

US 9,369,981 B2

METHOD AND APPARATUS FOR SENDING USER EQUIPMENT LOCATION INFORMATION

CROSS-REFERENCE TO RELATED APPLICATIONS

The present application is a U.S. National Stage Application under 35 U.S.C. §371 of International Application No. PCT/CN2012/073114, filed Mar. 27, 2012, entitled METHOD AND APPARATUS FOR SENDING USER EQUIPMENT LOCATION INFORMATION, designating the United States, and claiming priority to Chinese Patent Application No. 201110174366.7, filed with the State Intellectual Property Office of PRC on Jun. 24, 2011 and entitled "Method and apparatus for sending user equipment location information", the contents of which were incorporated by reference in their entirety.

FIELD

The present invention relates to the field of communications and particularly to a method and apparatus for transmitting location information of a user equipment.

BACKGROUND

The location of a User Equipment (UE) needs to be obtained at the network side for the purposes of e.g. lawful interception, emergent call, location-based charging, cell-level positioning, etc. A core network may be provided with cell-level identifier information of the UE in current standardized procedures of Attach, Tracking Area Updating (TAU), Service Request, X2 (an interface) Handover (HO), S1 (an interface) HO, etc. A Location Reporting procedure is also defined in the standards to obtain precise information about the current cell of the UE, in which the identifier of a cell currently serving the UE may be inquired immediately or an evolved Node B (eNB) may be configured to notify a Mobility Management Entity (MME) of the identifier of a serving cell immediately upon the UE changes the serving cell. For example, the MME sends a location reporting condition to the eNB in a Location Reporting Control message. The eNB sends cell identifier information of the UE to the MME in a Location Report message when the location reporting condition is satisfied.

In a Long Term Evolution-Advanced (LTE-A) system, a Relay Node (simply an RN) is introduced to improve network coverage. The RN is connected wirelessly with a Donor Evolved Node B (DeNB). A cell with which the RN is connected is a donor cell, and a cell on which a UE camps or with which the UE is connected is a serving cell of the UE. For high mobility scenario, the RN can be deployed in e.g., a railway, for the purposes of reducing the handover rate of the UE, improving the signal quality in a carriage, etc. In the case of the UE moving from a place A to a place B, but the RN serving the UE unchanged, the serving cell of the UE keeps unchanged. If information about the serving cell of the UE is reported as in the prior art, then the network side may consider the UE almost stationary according to the unchanged information about the serving cell, although the UE has actually moved far away. Obviously positioning for the UE is inaccurate from the information about the serving cell alone in the prior art.

SUMMARY

Embodiments of the invention provide a method and apparatus for transmitting location information of a user equipment to enable the location of the user equipment to be determined accurately at the network side.

A method at the RN side of transmitting location information of a user equipment includes:

a Relay Node, RN, receiving configuration information, indicating a user location information reporting condition, sent from a control plane management apparatus; and the RN sending cell-related information, indicating user location information, to the control plane management apparatus when the location information reporting condition is satisfied.

A method at the control plane management apparatus side of transmitting location information of a user equipment includes:

a control plane management apparatus sending configuration information, indicating a user location information reporting condition, to an RN; and the control plane management apparatus receiving cell-related information, indicating user location information, reported from the RN.

A relay node includes:

an interface module configured to receive configuration information, indicating a user location information reporting condition, sent from a control plane management apparatus; and a control module configured to instruct the interface module to send cell-related information, indicating user location information, to the control plane management apparatus upon determining that the location information reporting condition is satisfied.

A control plane management apparatus includes:

a sending module configured to send configuration information, indicating a user location information reporting condition, to an RN; and a receiving module configured to receive cell-related information, indicating user location information, reported from the RN.

A communication system includes:

a control plane management apparatus configured to send configuration information, indicating a user location information reporting condition, to an RN and to receive cell-related information, indicating user location information, reported from the RN; and the RN configured to receive the configuration information, indicating the user location information reporting condition, sent from the control plane management apparatus and to send the cell-related information, indicating the user location information, to the control plane management apparatus when the location information reporting condition is satisfied.

In the embodiments of the invention, a control plane management apparatus instructs an RN to report location information of a UE, the RN reports information about its donor cell to the control plane management apparatus or reports information about a serving cell with a cell identifier related to the donor cell to the control plane management apparatus. When the RN is moving, the information about the donor cell is changed, and the information about the donor cell or the information about the serving cell with a cell identifier related to the donor cell are reported to the control plane management apparatus, so that the control plane management apparatus may obtain the latest location information of the UE to thereby facilitate accurate determination at the network side (particularly by a core network) the location of the user equipment from the latest location information of the UE.

DETAILED DESCRIPTION

In embodiments of the invention, when a control plane management apparatus instructs an RN to report location information of a UE, the RN reports information about its donor cell to the control plane management apparatus or reports information about a serving cell with a TAI and/or ECGI value related to the donor cell to the control plane management apparatus. When the RN is moving, the information about the donor cell is changed, and the information about the donor cell or the information about the serving cell with a TAI and/or ECGI value related to the donor cell are reported to the control plane management apparatus, so that the control plane management apparatus may obtain the latest location information of the UE to thereby facilitate accurate determination at the network side (particularly by a core network) the location of the user equipment from the latest location information of the UE.

Figure 1:
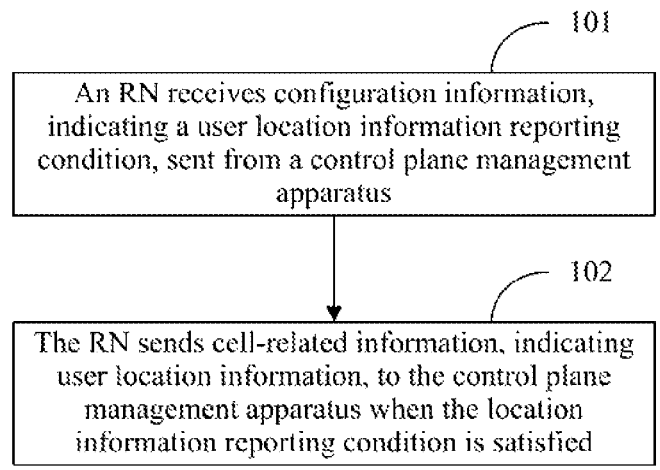
FIG. 1 is a flow chart of a method at the RN side of transmitting location information of a user equipment in an embodiment of the invention.

Reference is made to FIG. 1 illustrating a flow chart of a method at the RN side of transmitting location information of a user equipment in an embodiment as follows.

Step 101: A Relay Node (RN) receives configuration information, indicating a user location information reporting condition, sent from a mobility management entity (a control plane management apparatus).

Step 102: The RN sends cell-related information, indicating user location information, to the control plane management apparatus when the location information reporting condition is satisfied.

Figure 2:
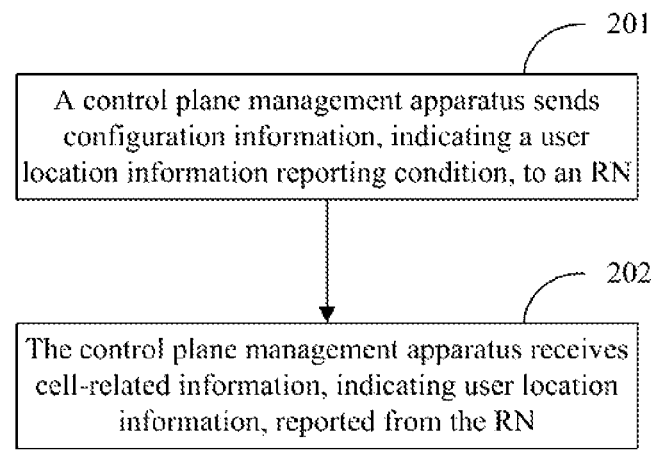
FIG. 2 is a flow chart of a method at the control plane management apparatus side of transmitting location information of a user equipment in an embodiment of the invention.

As opposed to the RN side, reference is made to FIG. 2 illustrating a flow chart of a method at the control plane management apparatus side of transmitting location information of a user equipment in an embodiment as follows.

Step 201: A control plane management apparatus sends configuration information, indicating a user location information reporting condition, to an RN.

Step 202: The control plane management apparatus receives cell-related information, indicating user location information, reported from the RN.

The control plane management apparatus determines a geographical location of the UE from the received cell-related information indicating the user location information.

In an embodiment, the configuration information indicating the user location information reporting condition includes at least one of the following conditions that: reporting is made immediately; the user location information is reported after the RN is handed over to a new donor cell or donor Node B; and the user location information is reported after the User Equipment (UE) is handed over between different cells.

The control plane management apparatus may further send configuration information, indicating reporting being disabled, to the RN when it is necessary to disable reporting after sending the configuration information indicating the user location information reporting condition.

For the step 101, there are numerous particular implementations, for example, the RN receives the configuration information, indicating the user location information reporting condition, sent from the control plane management apparatus in a Location Reporting Control message. Alternatively the RN receives the configuration information, indicating the user location information reporting condition, sent from the control plane management apparatus in an S1 Application Protocol (S1AP) message dedicated to transmission of the configuration information. As opposed to the step 101, there are also numerous particular implementations for the step 201, for example, the control plane management apparatus sends the configuration information, indicating the user location information reporting condition, to the RN in the Location Reporting Control message. Alternatively the control plane management apparatus sends the configuration information, indicating the user location information reporting condition, to the RN in the S1 Application Protocol (S1AP) message dedicated to transmission of the configuration information.

In an embodiment, the cell-related information indicating the user location information is information about a donor cell where the RN itself is located. Alternatively the cell-related information indicating the user location information is information about a serving cell with a TAI and/or ECGI value related to information about a donor cell where the RN itself is located.

When the cell-related information indicating the user location information is information about a donor cell where the RN itself is located, the information about the donor cell includes at least one of the following information: an Evolved Universal Terrestrial Radio Access Network (EUTRAN) Cell Global Identifier (ECGI) corresponding to the donor cell, a Tracking Cell Identifier (TAI) corresponding to the donor cell, a Global eNB ID of a donor Node B corresponding to the donor cell, a Node B name of the donor Node B corresponding to the donor cell, geographical location information of the RN and geographical location information of the donor Node B corresponding to the donor cell. Particularly the RN may obtain its own geographical location information and the geographical location information of the donor Node B from a Global Positioning System (GPS) or otherwise.

When the cell-related information indicating the user location information is information about a donor cell where the RN itself is located, the RN may further send information about a serving cell where the UE is located to the control plane management apparatus when the location information reporting condition is satisfied. The control plane management apparatus receives the information, about the serving cell where the UE is located, reported from the RN. The information about the donor cell and the information about the serving cell may be reported in one message.

When the cell-related information indicating the user location information is information about a serving cell with a TAI and/or ECGI value related to information about a donor cell where the RN itself is located, the information about the serving cell includes at least one of the following information: an ECGI corresponding to the serving cell and a TAI corresponding to the serving cell.

For the step 102, there are numerous particular implementations, or in other words, the RN may send the cell-related information, indicating the user location information, to the control plane management apparatus in numerous scenarios. For example, the RN sends the cell-related information, indicating the user location information, to the control plane management apparatus in a Location Report message. Alternatively the RN sends the cell-related information, indicating the user location information, to the control plane management apparatus in an S1AP message dedicated to reporting of the user location information. Alternatively the RN sends the cell-related information, indicating the user location information, to the control plane management apparatus in an Uplink Non-Access Stratum (NAS) Transport message when the UE performs an NAS procedure in a connected status. Alternatively the RN sends the cell-related information, indicating the user location information, to the control plane management apparatus in a Path Switch Request message when the UE is handed over to the RN from another Node B via an X2 interface. Alternatively the RN sends the cell-related information, indicating the user location information, to the control plane management apparatus in a Handover Notify message when the UE is handed over to the RN from another Node B via an S1 interface.

As opposed to the step 102, there are also numerous particular implementations for the step 202, for example, the control plane management apparatus receives the cell related information, indicating the user location information, reported from the RN in the Location Report message. Alternatively the control plane management apparatus receives the cell related information, indicating the user location information, reported from the RN in the S1AP message dedicated to reporting of the user location information. Alternatively the control plane management apparatus receives the cell related information, indicating the user location information, reported from the RN in the Uplink Non-Access Stratum (NAS) Transport message. Alternatively the control plane management apparatus receives the cell related information, indicating the user location information, reported from the RN in the Path Switch Request message. Alternatively the control plane management apparatus receives the cell related information, indicating the user location information, reported from the RN in the Handover Notify message.

The embodiments are primarily applicable to a scenario where the UE accesses the RN, thus the control plane management apparatus needs to know that the UE accesses a serving Node B which is the RN. Therefore the RN reports itself as an RN to the control plane management apparatus before receiving the configuration information, indicating the user location information reporting condition, sent from the control plane management apparatus. Particularly the RN reports itself as an RN to the control plane management apparatus in an S1 Setup Request message. Alternatively the RN reports itself as an RN to the control plane management apparatus in an S1AP message when the UE accesses the RN, where the UE initially accesses the RN or the UE is handed over to the RN. The control plane management apparatus receives information reported from the RN to indicate the RN as an RN and sends the configuration information, indicating the user location information reporting condition, to the RN upon determining from the information reported from the RN to indicate the RN as an RN that the UE accesses the RN. As opposed to the RN, the control plane management apparatus receives the information reported from the RN to indicate the RN as an RN in the S1 Setup Request message. Alternatively the control plane management apparatus receives the information reported from the RN to indicate the RN as an RN in the S1AP message when the UE accesses the RN.

As can be apparent from the foregoing description, there are numerous implementations possible for each step applicable to a variety of scenarios, and the implementations will be described below in details in several typical embodiments.

Figure 3:
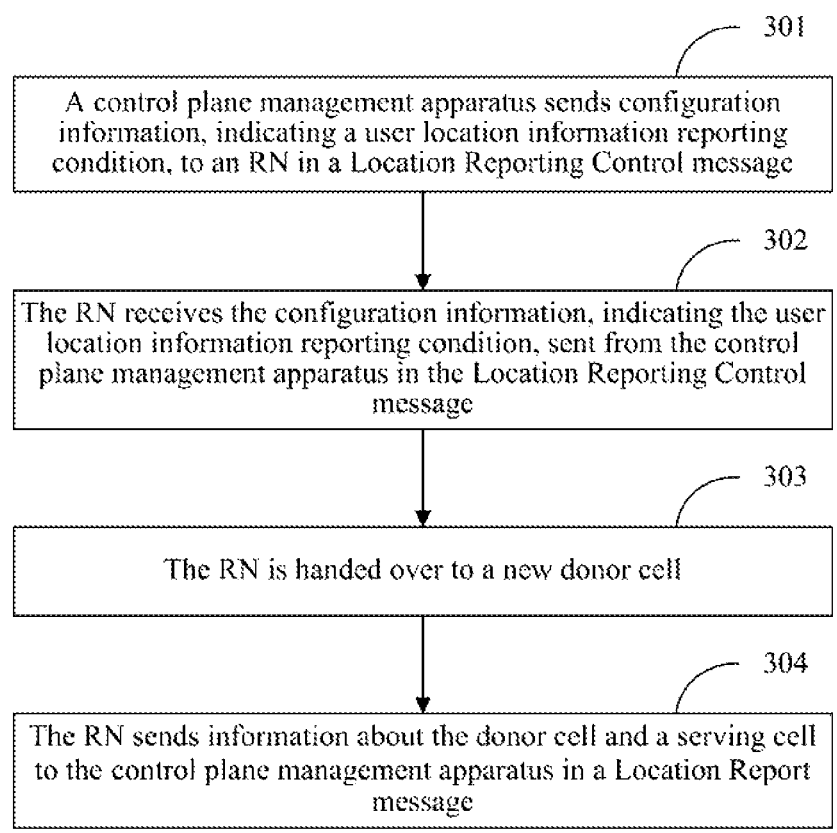
FIG. 3 is a flow chart of a method of reporting information about a donor cell and a serving cell in a Location Report message in an embodiment of the invention.

Reference is made to FIG. 3 illustrating a flow chart of a method of reporting information about a donor cell and a serving cell in a Location Report message in an embodiment as follows:

Step 301: A control plane management apparatus sends configuration information, indicating a user location information reporting condition, to an RN in a Location Reporting Control message.

Step 302: The RN receives the configuration information, indicating the user location information reporting condition, sent from the control plane management apparatus in the Location Reporting Control message.

Step 303: The RN is handed over to a new donor cell.

Step 304: The RN sends information about the donor cell and a serving cell to the control plane management apparatus in a Location Report message. The Location Report message may be extended to carry the information about the donor cell.

In an embodiment, a new S1AP procedure may be defined to transmit the configuration information and report the location information.

Figure 4:
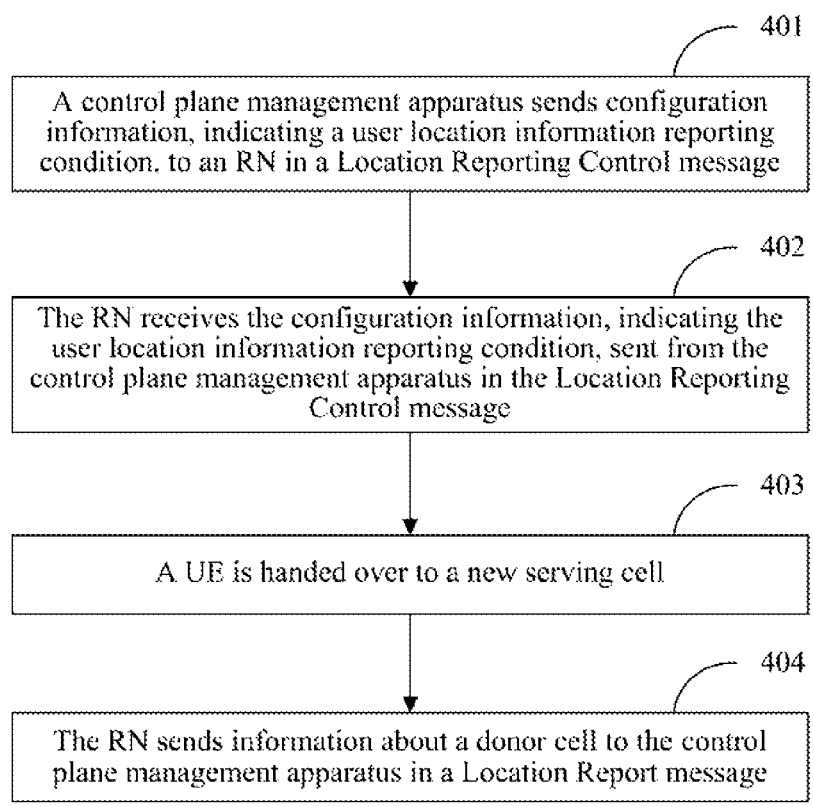
FIG. 4 is a flow chart of a method of reporting information about a donor cell in a Location Report message in an embodiment of the invention.

Reference is made to FIG. 4 illustrating a flow chart of a method of reporting information about a donor cell in a Location Report message in an embodiment as follows:

Step 401: A control plane management apparatus sends configuration information, indicating a user location information reporting condition, to an RN in a Location Reporting Control message.

Step 402: The RN receives the configuration information, indicating the user location information reporting condition, sent from the control plane management apparatus in the Location Reporting Control message.

Step 403: A UE is handed over to a new serving cell. It may be an inter-Node B handover or an intra-Node B (including intra-RN) handover.

Step 404: The RN sends information about its donor cell to the control plane management apparatus in a Location Report message. The information about the donor cell occupies a filed in the Location Report message, which is a field occupied in a Location Report message by information about a serving cell in the prior art.

Figure 5:
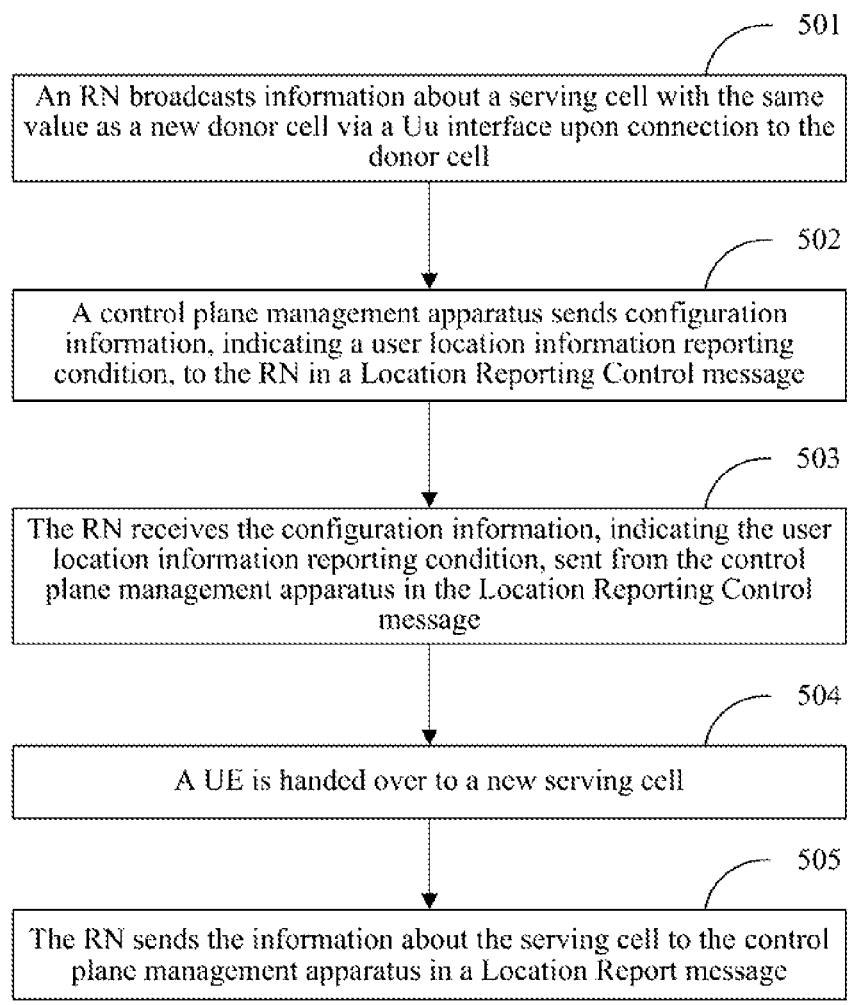
FIG. 5 is a flow chart of a method of reporting information about a serving cell in a Location Report message in an embodiment of the invention.

Reference is made to FIG. 5 illustrating a flow chart of a method of reporting information about a serving cell in a Location Report message in an embodiment as follows:

Step 501: An RN broadcasts information about a serving cell with a cell identifier related to a new donor cell via a Uu interface upon connection to the donor cell. The information about the serving cell primarily includes a TAI and an ECGI. For example, the value of the TAI of the serving cell may be kept consistent with a TAI of the donor cell. First 20 bits of the ECGI of the serving cell are kept consistent with first 20 bits of an ECGI of the donor cell, and last 8 bits are different from the cell of a donor Node B.

Step 502: A control plane management apparatus sends configuration information, indicating a user location information reporting condition, to the RN in a Location Reporting Control message. This step may not necessarily be performed strictly subsequent to the step 501.

Step 503: The RN receives the configuration information, indicating the user location information reporting condition, sent from the control plane management apparatus in the Location Reporting Control message.

Step 504: A UE is handed over to a new serving cell. It may be an inter-Node B handover or an intra-Node B (including intra-RN) handover.

Step 505: The RN sends the information about the serving cell to the control plane management apparatus in a Location Report message.

Figure 6:
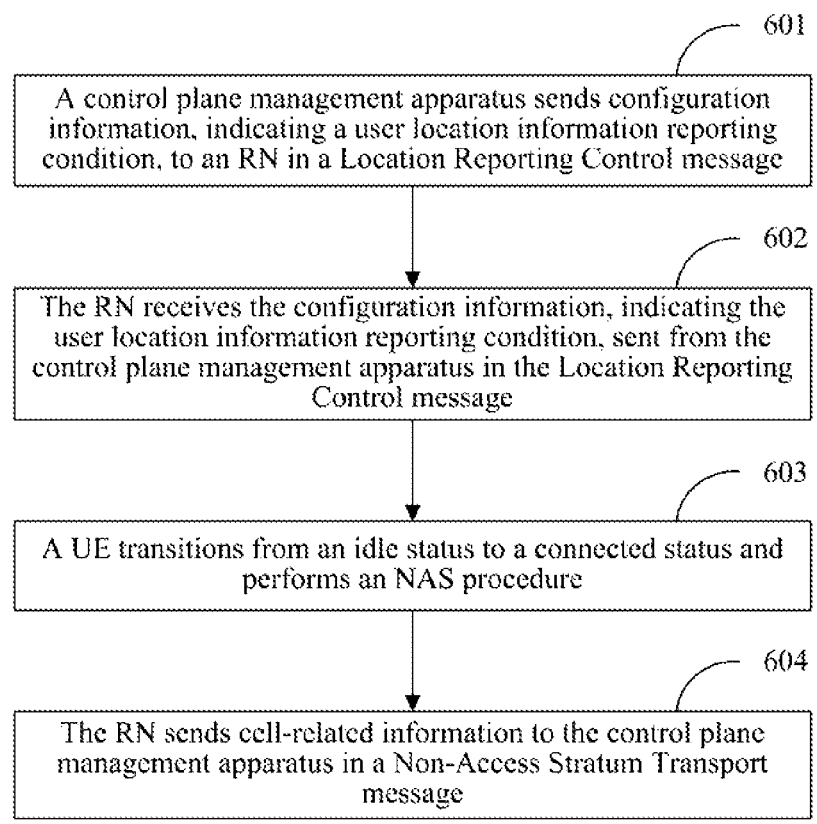
FIG. 6 is a flow chart of a method of reporting cell-related information in a Non-Access Stratum Transport message in an embodiment of the invention.

Reference is made to FIG. 6 illustrating a flow chart of a method of reporting cell-related information in a Non-Access Stratum Transport message in an embodiment as follows:

Step 601: A control plane management apparatus sends configuration information, indicating a user location information reporting condition, to an RN in a Location Reporting Control message.

Step 602: The RN receives the configuration information, indicating the user location information reporting condition, sent from the control plane management apparatus in the Location Reporting Control message.

Step 603: A UE transitions from an idle status to a connected status and performs an NAS procedure; and Step 604: The RN sends cell-related information to the control plane management apparatus in a Non-Access Stratum Transport message. The cell-related information includes information about a donor cell and information about a serving cell, or only the information about the donor cell, or the information about the serving cell with a TAI and/or ECGI value related to the donor cell.

Figure 7:
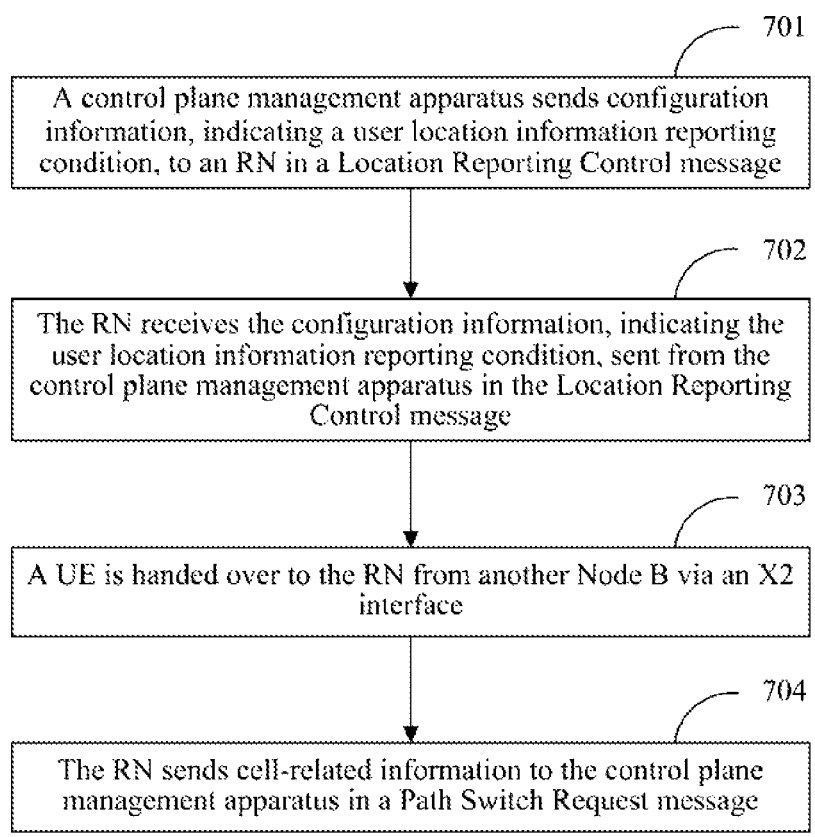
FIG. 7 is a flow chart of a method of reporting cell-related information in a Path Switch Request message in an embodiment of the invention.

Reference is made to FIG. 7 illustrating a flow chart of a method of reporting cell-related information in a Path Switch Request message in an embodiment as follows:

Step 701: A control plane management apparatus sends configuration information, indicating a user location information reporting condition, to an RN in a Location Reporting Control message.

Step 702: The RN receives the configuration information, indicating the user location information reporting condition, sent from the control plane management apparatus in the Location Reporting Control message.

Step 703: A UE is handed over to the RN from another Node B via an X2 interface; and Step 704: The RN sends cell-related information to the control plane management apparatus in a Path Switch Request message. The cell-related information includes information about a donor cell and information about a serving cell, or only the information about the donor cell, or the information about the serving cell with a TAI and/or ECGI value related to the donor cell.

Figure 8:
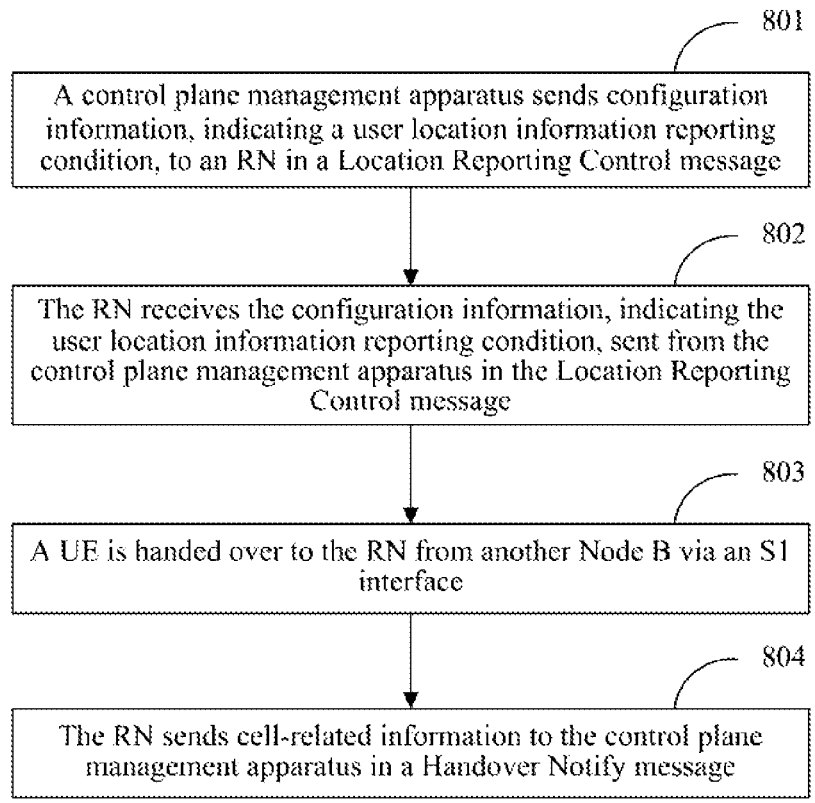
FIG. 8 is a flow chart of a method of reporting cell-related information in a Handover Notify message in an embodiment of the invention.

Reference is made to FIG. 8 illustrating a flow chart of a method of reporting cell-related information in a Handover Notify message in an embodiment as follows:

Step 801: A control plane management apparatus sends configuration information, indicating a user location information reporting condition, to an RN in a Location Reporting Control message.

Step 802: The RN receives the configuration information, indicating the user location information reporting condition, sent from the control plane management apparatus in the Location Reporting Control message.

Step 803: A UE is handed over to the RN from another Node B via an S1 interface; and Step 804: The RN sends cell-related information to the control plane management apparatus in a Handover Notify message. The cell-related information includes information about a donor cell and information about a serving cell, or only the information about the donor cell, or the information about the serving cell with a TAI and/or ECGI value related to the donor cell.

The implementations of transmission of location information have been appreciated from the foregoing description, and they are generally practiced by the RN and the control plane management apparatus, internal structures and functions of which will be described below.

Figure 9:
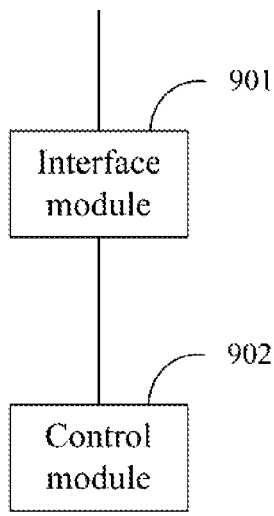
FIG. 9 is a structural diagram of an RN in an embodiment of the invention.

Referring to FIG. 9, a relay node in an embodiment includes an interface module 901 and a control module 902.

The interface module 901 is configured to send and receive various information and messages, particularly receive configuration information, indicating a user location information reporting condition, sent from a control plane management apparatus. The interface module 901 includes a transceiver, an antenna, etc. The configuration information indicating the user location information reporting condition includes at least one of the following conditions that: user location information is reported after the RN is handed over to a new donor cell or donor Node B; and user location information is reported after a User Equipment (UE) is handed over between different cells. Particularly the interface module 901 receives the configuration information, indicating the user location information reporting condition, sent from the control plane management apparatus in a Location Reporting Control message. Alternatively the interface module 901 receives the configuration information, indicating the user location information reporting condition, sent from the control plane management apparatus in an S1 Application Protocol (S1AP) message dedicated to transmission of the configuration information.

The control module 902 is configured to generate and parse various messages, particularly instruct the interface module to send cell-related information, indicating the user location information, to the control plane management apparatus upon determining that the location information reporting condition is satisfied. The control module 902 includes a CPU and other executing devices. Particularly the interface module 901 sends the cell-related information, indicating the user location information, to the control plane management apparatus in a Location Report message. Alternatively the interface module 901 sends the cell-related information, indicating the user location information, to the control plane management apparatus in an S1AP message dedicated to reporting of the user location information. Alternatively the interface module 901 sends the cell-related information, indicating the user location information, to the control plane management apparatus in an Uplink Non-Access Stratum (NAS) Transport message. Alternatively the interface module 901 sends the cell-related information, indicating the user location information, to the control plane management apparatus in a Path Switch Request message. Alternatively the interface module 901 sends the cell-related information, indicating the user location information, to the control plane management apparatus in a Handover Notify message.

The cell-related information indicating the user location information is information about a donor cell where the RN itself is located. The information about the donor cell includes at least one of the following information: an EUTRAN Cell Global Identifier (ECGI) corresponding to the donor cell, a Tracking Cell Identifier (TAI) corresponding to the donor cell, a Global eNB ID of a donor Node B corresponding to the donor cell, a Node B name of a donor Node B corresponding to the donor cell, geographical location information of the RN and geographical location information of the donor Node B corresponding to the donor cell. The interface module 901 is further configured to send information about a serving cell where the UE is located to the control plane management apparatus.

The cell-related information indicating the user location information is information about a serving cell with a TAI and/or ECGI value related to information about a donor cell where the RN itself is located. The information about the serving cell includes at least one of the following information: an ECGI corresponding to the serving cell and a TAI corresponding to the serving cell.

The interface module 901 is further configured to report itself as an RN to the control plane management apparatus. Particularly the interface module 901 reports itself as an RN to the control plane management apparatus in an S1 Setup Request message. Alternatively the interface module 901 reports itself as an RN to the control plane management apparatus in an S1AP message when the UE accesses the RN.

Figure 10:
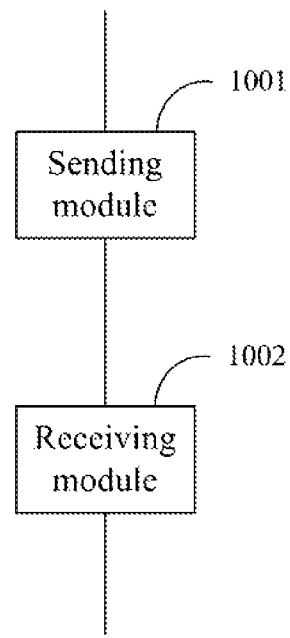
FIG. 10 is a structural diagram of a control plane management apparatus in an embodiment of the invention.

Referring to FIG. 10, a control plane management apparatus in an embodiment includes a sending module 1001 and a receiving module 1002. The sending module 1001 and the receiving module 1002 may belong to the same interface unit. In an embodiment, the control plane management apparatus may be an MME in an Evolved Packet System (EPS) or a Serving GPRS Supporting Node (SGSN) in a third-generation (3G) communication system.

The sending module 1001 is configured to send various messages, particularly send configuration information, indicating a user location information reporting condition, to an RN. The configuration information indicating the user location information reporting condition includes at least one of the following conditions that: user location information is reported after the RN is handed over to a new donor cell or donor Node B; and user location information is reported after a User Equipment (UE) is handed over between different cells. Particularly the sending module 1001 sends the configuration information, indicating the user location information reporting condition, to the RN in a Location Reporting Control message. Alternatively the sending module 1001 sends the configuration information, indicating the user location information reporting condition, to the RN in an S1 Application Protocol (S1AP) message dedicated to transmission of the configuration information.

The receiving module 1002 is configured to receive various messages, particularly receive cell-related information, indicating user location information, reported from the RN. Particularly the receiving module 1002 receives the cell-related information, indicating the user location information, reported from the RN in a Location Report message. Alternatively the receiving module 1002 receives the cell-related information, indicating the user location information, reported from the RN in an S1AP message dedicated to reporting of the user location information. Alternatively the receiving module 1002 receives the cell-related information, indicating the user location information, reported from the RN in an Uplink Non-Access Stratum (NAS) Transport message. Alternatively the receiving module 1002 receives the cell-related information, indicating the user location information, reported from the RN in a Path Switch Request message. Alternatively the receiving module 1002 receives the cell-related information, indicating the user location information, reported from the RN in a Handover Notify message.

The cell-related information indicating the user location information is information about a donor cell where the RN itself is located. The information about the donor cell includes at least one of the following information: an EUTRAN Cell Global Identifier (ECGI) corresponding to the donor cell, a Tracking Cell Identifier (TAI) corresponding to the donor cell, a Global eNB ID of a donor Node B corresponding to the donor cell, a Node B name of a donor Node B corresponding to the donor cell, geographical location information of the RN and geographical location information of the donor Node B corresponding to the donor cell. The receiving module 1002 is further configured to receive information about a serving cell, where the UE is located, reported from an RN.

Alternatively the cell-related information indicating the user location information is information about a serving cell with a TAI and/or ECGI value related to information about a donor cell where the RN itself is located. The information about the serving cell includes at least one of the following information: an ECGI corresponding to the serving cell and a TAI corresponding to the serving cell.

The receiving module 1002 is further configured to receive information reported from the RN to indicate the RN as an RN. The sending module 1001 sends the configuration information, indicating the user location information reporting condition, to the RN upon determining from the information reported from the RN to indicate the RN as an RN that a UE accesses the RN. Particularly the receiving module 1002 receives the information reported from the RN to indicate the RN as an RN in an S1 Setup Request message. Alternatively the receiving module 1002 receives the information reported from the RN to indicate the RN as an RN in an S1AP message when the UE accesses the RN.

The control plane management apparatus may further include a control module (not illustrated) configured to determine from the information reported from the RN to indicate the RN as an RN that the UE accesses the RN and to determine a geographical location of the UE from the received cell-related information indicating the user location information. The control module is further configured to generate and parse various messages.

Figure 11:
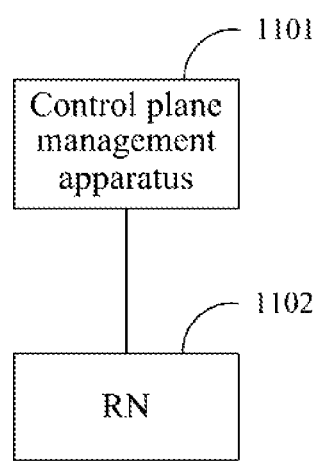
FIG. 11 is a structural diagram of a communication system in an embodiment of the invention.

In an embodiment, the control plane management apparatus and the RN may constitute a communication system as illustrated in FIG. 11.

A control plane management apparatus 1101 is configured to send configuration information, indicating a user location information reporting condition, to an RN and to receive cell-related information, indicating user location information, reported from the RN 1102.

The RN 1102 is configured to receive the configuration information, indicating a user location information reporting condition, sent from the control plane management apparatus 1101 and to send the cell-related information, indicating the user location information, to the control plane management apparatus 1101 when the location information reporting condition is satisfied.

The information and messages may be forwarded between the control plane management apparatus 1101 and the RN 1102 through a donor Node B of the RN 1102.

In the embodiments of the invention, when a control plane management apparatus instructs an RN to report location information of a UE, the RN reports information about its donor cell to the control plane management apparatus or reports information about a serving cell with a TAI and/or ECGI value related to the donor cell to the control plane management apparatus. When the RN is moving, the information about the donor cell is changed, and the information about the donor cell or the information about the serving cell with a TAI and/or ECGI value related to the donor cell are reported to the control plane management apparatus, so that the control plane management apparatus may obtain the latest location information of the UE to thereby facilitate accurate determination at the network side (particularly by a core network) the location of the user equipment from the latest location information of the UE. The embodiments of the invention provide numerous implementations applicable to demands in different scenarios to thereby facilitate obtaining of the latest location information of the UE by the control plane management apparatus and better determination of a geographical location of the UE. In a scenario with mobility of the RN, with the solution according to the embodiments of the invention, the core network may obtain information about the geographical location of the UE while the UE is moving with the RN to thereby perform location-based charging, lawful interception, an emergent call and other functions. The solution is also applicable to other types of mobile Node B's connected to the core network through a relatively immobile proxy node.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the scope of the invention. Thus the invention is also intended to encompass these modifications and variations thereto so long as the modifications and variations come into the scope of the claims appended to the invention and their equivalents.

What is claimed is:

1. A method of transmitting location information of a User Equipment, UE, comprising:
 a Relay Node, RN, receiving configuration information, indicating a user location information reporting condition, sent from a control plane management apparatus; and
 the RN sending cell-related information, indicating user location information, to the control plane management apparatus when the location information reporting condition is satisfied,
 wherein the cell-related information indicating the user location information is:
  information about a donor cell where the RN itself is located; or
  information about a serving cell with a Tracking Cell Identifier (TAI) value and/or an Evolved Universal Terrestrial Radio Access Network (EUTRAN) Cell Global Identifier (ECGI) value related to information about a donor cell where the RN itself is located,
 wherein the configuration information indicating the user cation information reporting condition comprises at least one of the following conditions that:
  reporting is made immediately;
  the user location information is reported after the RN is handed over to a new donor cell or donor Node B; and
  the user location information is reported after the UE is handed over between different cells.

2. The method of claim 1, wherein the information about the donor cell comprises at least one of: an EUTRAN Cell Global Identifier, ECGI, corresponding to the donor cell, a Tracking Cell Identifier, TAI, corresponding to the donor cell, a Global eNB ID of a donor Node B corresponding to the donor cell, a Node B name of the donor Node B corresponding to the donor cell, geographical location information of the RN and geographical location information of the donor Node B corresponding to the donor cell; or
 the cell-related information indicating the user location information being the information about the serving cell with a TAI and/or ECGI value related to the information about the donor cell where the RN itself is located refers to that: a value of the TAI of the serving cell is consistent with that of the donor cell, a value of first 20 bits of the ECGI of the serving cell is consistent with that of an ECGI of the donor cell, and a value of last 8 bits of the ECGI of the serving cell is different from that of the ECGI of the donor cell.

3. The method of claim 1, further comprising: the RN sending information about a serving cell where the UE is located to the control plane management apparatus when the location information reporting condition is satisfied.

4. The method of claim 1, wherein the RN receiving the configuration information, indicating the user location information reporting condition, sent from the control plane management apparatus comprises:

the RN receiving the configuration information, indicating the user location information reporting condition, sent from the control plane management apparatus in a Location Reporting Control message; or the RN receiving the configuration information, indicating the user location information reporting condition, sent from the control plane management apparatus in an S1 Application Protocol, S1AP, message dedicated to transmission of the configuration information.

5. The method of claim 1, wherein the RN sending the cell-related information, indicating the user location information, to the control plane management apparatus comprises:

the RN sending the cell-related information, indicating the user location information, to the control plane management apparatus in a Location Report message; or the RN sending the cell-related information, indicating the user location information, to the control plane management apparatus in an S1AP message dedicated to reporting of the user location information; or the RN sending the cell-related information, indicating the user location information, to the control plane management apparatus in an Uplink Non-Access Stratum, NAS, Transport message; or the RN sending the cell-related information, indicating the user location information, to the control plane management apparatus in a Path Switch Request message; or the RN sending the cell-related information, indicating the user location information, to the control plane management apparatus in a Handover Notify message.

6. The method of claim 1, wherein before the RN receives the configuration information, indicating the user location information reporting condition, sent from the control plane management apparatus, the method further comprises: the RN reporting itself as an RN to the control plane management apparatus.

7. The method of claim 6, wherein the RN reporting itself as an RN to the control plane management apparatus comprises:

the RN reporting itself as an RN to the control plane management apparatus in an S1 Setup Request message; or the RN reporting itself as an RN to the control plane management apparatus in an S1AP message when the UE accesses the RN.

8. A method of transmitting location information of a User Equipment, UE, comprising:

a control plane management apparatus sending configuration information, indicating a user location information reporting condition, to an RN; and the control plane management apparatus receiving cell-related information, indicating user location information, reported from the RN, wherein the cell-related information indicating the user location information is:

information about a donor cell where the RN itself is located; or information about a serving cell with a TAI and/or ECGI value related to information about a donor cell where the RN itself is located, wherein the configuration information indicating the user location information reporting condition comprises at least one of the following conditions that:

reporting is made immediately;

the user location information is reported after the RN is handed over to a new donor cell or donor Node B; and the user location information is reported after the UE is handed over between different cells.

9. The method of claim 8, wherein the information about the donor cell comprises at least one of: an EUTRAN Cell Global Identifier, ECGI, corresponding to the donor cell, a Tracking Cell Identifier, TAI, corresponding to the donor cell, a Global eNB ID of a donor Node B corresponding to the donor cell, a Node B name of the donor Node B corresponding to the donor cell, geographical location information of the RN and geographical location information of the donor Node B corresponding to the donor cell; or the cell-related information indicating the user location information being the information about the serving cell with a TAI and/or ECGI value related to the information about the donor cell where the RN itself is located refers to that: a value of the TAI of the serving cell is consistent with that of the donor cell, a value of first 20 bits of the ECGI of the serving cell is consistent with that of an ECGI of the donor cell, and a value of last 8 bits of the ECGI of the serving cell is different from that of the ECGI of the donor cell.

10. The method of claim 8, further comprising: the control plane management apparatus receiving information, about a serving cell where the UE is located, reported from the RN.

11. A relay node, comprising:

an interface module configured to receive configuration information, indicating a user location information reporting condition, sent from a control plane management apparatus; and a control module configured to instruct the interface module to send cell-related information, indicating user location information, to the control plane management apparatus upon determining that the location information reporting condition is satisfied, wherein the cell-related information indicating the user location information is:

information about a donor cell where the RN itself is located; or information about a serving cell with a TAI and/or ECGI value related to information about a donor cell where the RN itself is located;

wherein the interface module comprises a transceiver and an antenna;

wherein the control module comprises a processor, and wherein the configuration information indicating the user location information reporting condition comprises at least one of the following conditions that:

reporting is made immediately;

the user location information is reported after the RN is handed over to a new donor cell or donor Node B; and the user location information is reported after the UE is handed over between different cells.

12. The relay node of claim 11, wherein the information about the donor cell comprises at least one of: an EUTRAN Cell Global Identifier, ECGI, corresponding to the donor cell, a Tracking Cell Identifier, TAI, corresponding to the donor cell, a Global eNB ID of a donor Node B corresponding to the donor cell, a Node B name of the donor Node B corresponding to the donor cell, geographical location information of the RN and geographical location information of the donor Node B corresponding to the donor cell; or the cell-related information indicating the user location information being the information about the serving cell with a TAI and/or ECGI value related to the information about the donor cell where the RN itself is located refers to that: a value of the TAI of the serving cell is consistent with that of the donor cell, a value of first 20 bits of the ECGI of the serving cell is consistent with that of an ECGI of the donor cell, and a value of last 8 bits of the ECGI of the serving cell is different from that of the ECGI of the donor cell.

13. The relay node of claim 11, wherein the interface module is configured to send information about a serving cell where a UE is located to the control plane management apparatus when the location information reporting condition is satisfied.

14. The relay node of claim 11, wherein the interface module receiving the configuration information, indicating the user location information reporting condition, sent from the control plane management apparatus comprises:
- the interface module receiving the configuration information, indicating the user location information reporting condition, sent from the control plane management apparatus in a Location Reporting Control message; or
- the interface module receiving the configuration information, indicating the user location information reporting condition, sent from the control plane management apparatus in an S1 Application Protocol, S1AP, message dedicated to transmission of the configuration information.

\* \* \* \* \*